United States Patent [19]

Okubo et al.

[11] Patent Number: 5,243,378
[45] Date of Patent: Sep. 7, 1993

[54] EXPOSURE-SCANNING DEVICE

[75] Inventors: Kenzo Okubo, Habikino; Kazuya Akura, Sakai, both of Japan

[73] Assignee: Mita Industrial Co., Ltd., Osaka, Japan

[21] Appl. No.: 848,115

[22] Filed: Mar. 9, 1992

[30] Foreign Application Priority Data

Mar. 12, 1991 [JP] Japan .................................. 3-46926

[51] Int. Cl.⁵ .............................................. G03B 27/70
[52] U.S. Cl. .................................................... 355/66
[58] Field of Search ..................... 355/55, 56, 60, 66

[56] References Cited

U.S. PATENT DOCUMENTS 4,996,559  2/1991  Sakamoto et al. ................. 355/56

Primary Examiner—D. Rutledge
Attorney, Agent, or Firm—Sandler Greenblum & Bernstein

[57] ABSTRACT

An exposure-scanning device comprising a guide member horizontally arranged, a scanning member slidably mounted to the guide member for performing an exposure-scanning operation upper and lower rollers rotatably mounted to the scanning member, both rollers vertically sandwiching the guide member, and an urging means provided at the scanning member for upwardly urging the lower roller to be constantly in contact with the guide member.

9 Claims, 4 Drawing Sheets

EXPOSURE-SCANNING DEVICE

BACKGROUND OF THE INVENTION

1. Field of the Invention

The present invention relates to an exposure-scanning device, and more particularly to an exposure-scanning device of a mirror scanning type which is installed into an image forming apparatus such as an electrophotographic copying machine, facsimile or the like for performing a slit exposure by moving mirrors for exposure-scanning.

2. Prior Art

A conventional exposure-scanning device of a mirror scanning type installed into an electrophotographic copying machine or the like comprises a pair of guide members horizontally arranged parallel to each other, scanning members slidably provided to the pair of guide members and having an exposure-scanning mirror or the other elements mounted thereon and a pair of upper and lower rollers provided at both ends of each scanning member for enabling the scanning member to slidably move. Each of the guide members is sandwiched between these upper and lower rollers.

The exposure-scanning device of the above-mentioned type is assembled as follows. First, the upper roller is mounted on the scanning member through the bracket to which the upper roller is attached. Thereafter, the resultant scanning member is placed on the guide members to be supported by the upper roller. Subsequently, the bracket having provided with the lower roller is mounted to the scanning member on the guide members. The bracket with the lower roller is screwed to or bolted with a nut to the scanning member.

However, the above-mentioned assembling operation of the exposure-scanning device entails a following problem. Specifically, such an assembling operation requires a screwing operation for fixing the bracket having the lower roller to the scanning member with a screw or a bolt and nut. The screwing operation causes the bracket having the lower roller to move in the screwing direction in accordance with the rotation of the screw or bolt in the screwing direction (i.e., normally in the clockwise direction).

The unintentional movement of the bracket changes the space between the upper and lower rollers which is set before the screwing operation, whereby disadvantages occur such that the lower roller does not get in contact with the guide member or the lower roller is in pressing contact with the guide members with a pressure different from the predetermined pressure. When the scanning member slidably moves on the guide member with such disadvantages, the mirror or the other elements mounted on the scanning member cannot perform a stable scanning operation. Therefore, an image blur may occur upon image formation.

SUMMARY OF THE INVENTION

The object of the present invention is to provide an exposure-scanning device in which a mirror or the other elements mounted on a scanning member can perform a stable scanning operation by maintaining a constant distance between upper and lower rollers which is set before the screwing operation, whereby an image blur which may occur upon image formation can be prevented.

The above-mentioned object is accomplished by providing an exposure-scanning device comprising a guide member horizontally arranged, a scanning member slidably mounted to the guide member for performing an exposure-scanning operation, upper and lower rollers rotatably mounted to the scanning member, both rollers vertically sandwiching the guide member, and an urging means provided at the scanning member for upwardly urging the lower roller to be constantly in contact with the guide member.

According to the exposure-scanning device of the present invention, the space between the upper and lower rollers can be fixedly maintained in accordance with the vertical width of the guide member, whereby the mirror or the other elements mounted on the scanning member for exposure-scanning can perform a stable scanning operation. Accordingly, an image blur which may occur upon image formation can be prevented.

BRIEF DESCRIPTION OF THE DRAWINGS

These and other objects and features of the present invention will become apparent from the following description taken in conjunction with the preferred embodiment thereof with reference to the accompanying drawings, in which.

PREFERRED EMBODIMENT OF THE INVENTION

In the present invention, examples of the urging means include a member attached to the scanning member for urging the lower roller to be constantly in pressing contact with the guide member. Such a member is made of an elastic member, e.g., a helical spring, a leaf spring, rubber or the like.

In the present invention, the lower roller is preferably provided at one end of the bracket to which the lower roller is attached. The urging means preferably comprises a support member pivotably supporting the bracket, at its center, to the scanning member to allow its up and down movement with respect to the scanning member, a screw member screwed to the scanning member through the other end of the bracket and a spring member provided from the screw member to the support member for urging the lower roller to be constantly in contact with the guide member. The screw member is freely movable in a threaded hole into which the screw member is inserted when it is slightly loosened.

Usable materials for the bracket include a slender metal plate or the like. The support member pivotably fixes the bracket to the scanning member directly or through the other members. The spring member causes the lower roller to be constantly in contact with the guide member. Examples of the support member to be used are a screw, pin or the like. A spring bearing to which the spring member is mounted may be used together with the support member.

The screw member is preferably screwed to the bracket through a sliding washer which slides on the surface where the other end of the bracket to which the lower roller is attached is in contact with the washer. A predetermined space is preferably present between the screw head and the washer. The spring member is preferably bridged from the support member to the space of the screw member.

The screw member is screwed to the bracket through a plurality of laminated plastic thrust washers serving as sliding washers. The predetermined space of the screw member is formed between the screw head thereof and the washers. A pin having an external thread formed only at the center thereof in the lengthwise direction is, for example, used as the screw member. Examples of the thrust washers are two polyacetal resin plates each having a thickness of 0.5 mm. An example of the spring member is a torsional helical spring.

The sliding washers are provided such that the bracket with the lower roller cannot move in the screwing direction even when the screw member is screwed. Specifically, the rotational force generated upon the screwing operation does not affect the bracket due to a single or a plurality of sliding washers which slide on the contact surface of the other end of the bracket or on the contact surface of each laminated washers.

The present invention will be explained in detail hereinbelow with reference to the accompanying drawings, by which the present invention shall not be limited.

Figure 1:
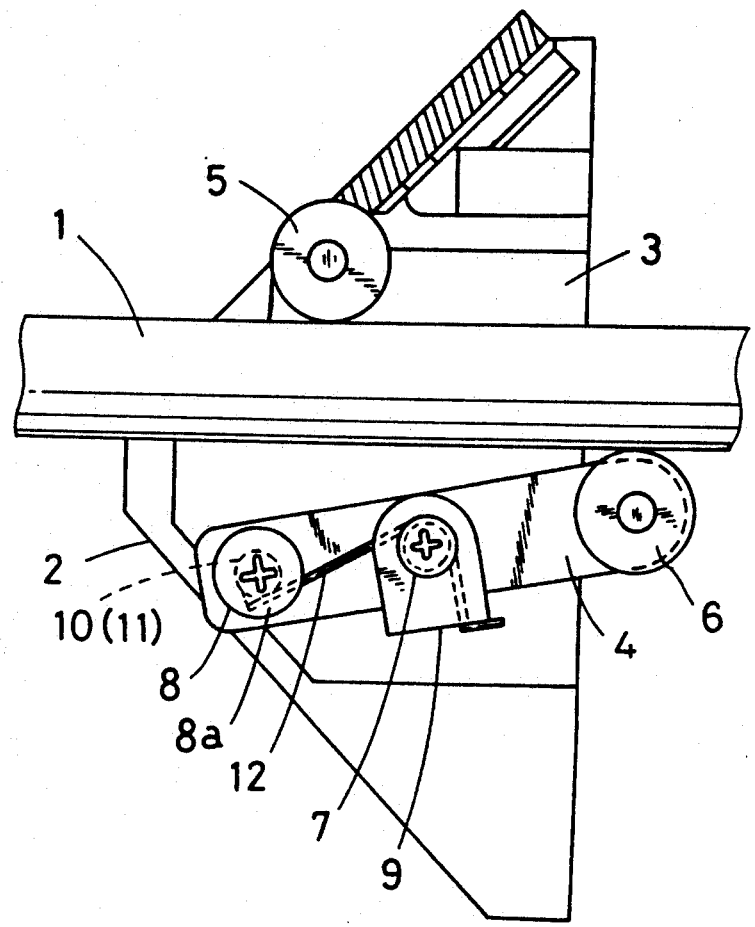
FIG. 1 is an enlarged side view showing an essential part of an exposure-scanning device embodying the present invention.
Figure 3:
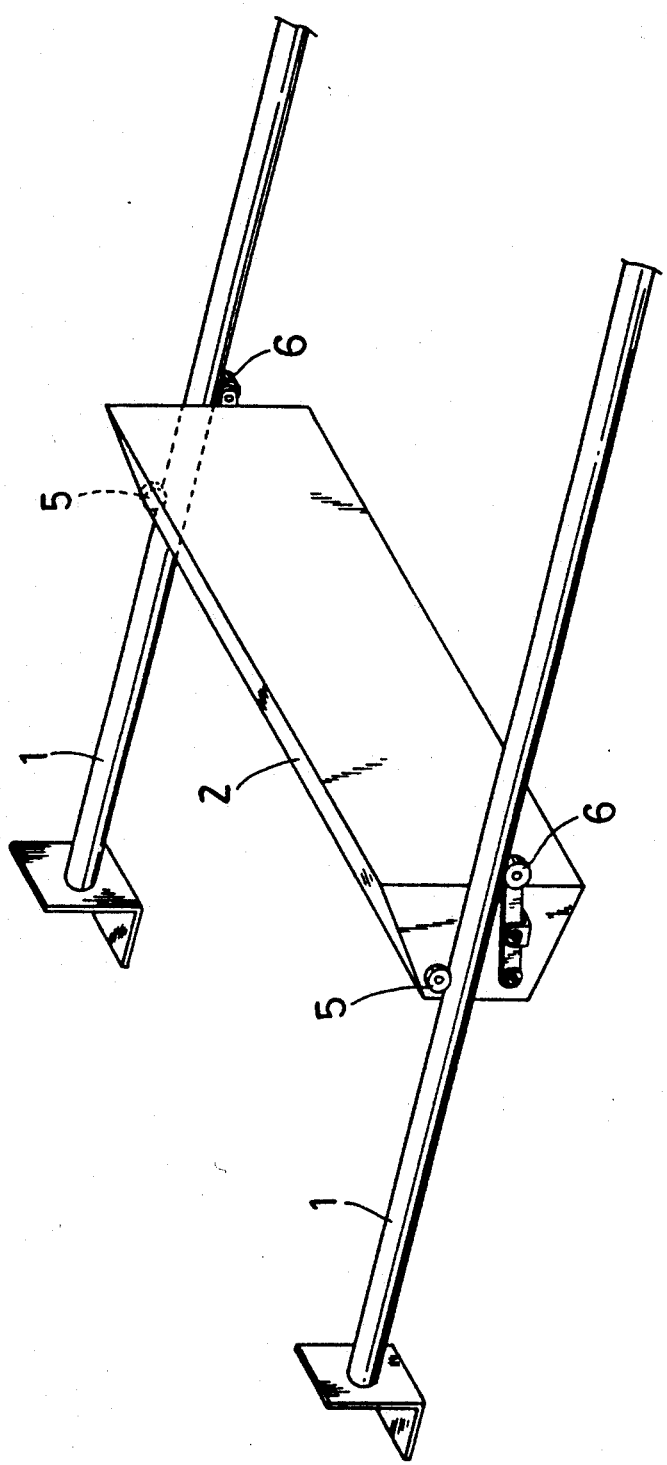
FIG. 3 is a perspective view entirely showing the exposure-scanning device.

As shown in FIGS. 1 and 3, an exposure-scanning device used in an electrophotographic copying machine comprises a pair of guide rods 1 (one of which is shown in FIG. 1) horizontally arranged parallel to each other for serving as a pair of guide members, second carriages 2, serving as a scanning member, mounted slidably on the pair of guide rods 1 and provided with a mirror or the other elements for performing an exposure-scanning operation, and upper and lower rollers 5 and 6 rotatably provided at both ends of each carriage 2 (one end thereof is shown in FIG. 1) through brackets 3 and 4 respectively. The upper and lower rollers 5 and 6 vertically sandwich the guide rod 1 for slidably moving the second carriage 2 by a driving means.

The exposure-scanning device is also provided with a support pin 7 mounted at the center of the rectangular plate-like bracket 4 in the lengthwise direction and a fixed pin 8. The support pin 7 serves as a support member for rotatably mounting the bracket 4 to the second carriage 2 through the trapezoid plate-like bracket 3. The fixed pin 8 serves as a screw member screwed to one end of the bracket 4 opposite to the other end provided with the lower roller 6.

Figure 2:
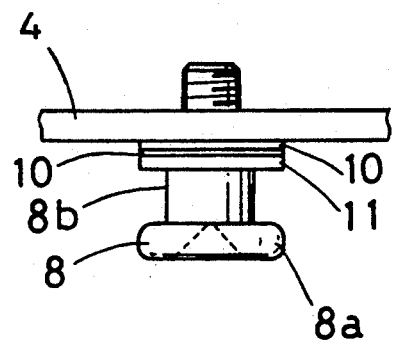
FIG. 2 is an enlarged plan view showing an essential part of the exposure-scanning device.

The bracket 4 has a spring bearing 9 provided coaxially with the support pin 7. The fixed pin 8, which is made of steel, has an external thread formed only at the center thereof in the lengthwise direction. As shown in FIG. 2, the fixed pin 8 is screwed to the bracket 3 through a pair of thrust washers (sliding washers) 10, 10 made of polyacetal resin, a single steel washer 11 having a thickness of 1.0 mm and the bracket 4. The thrust washers 10, 10, each having a thickness of 0.5 mm, are laminated with each other. A predetermined distance is present between the thrust washers 10, 10 and a screw head 8a of the fixed pin 8 between which the washer 11 is present.

Figure 4:
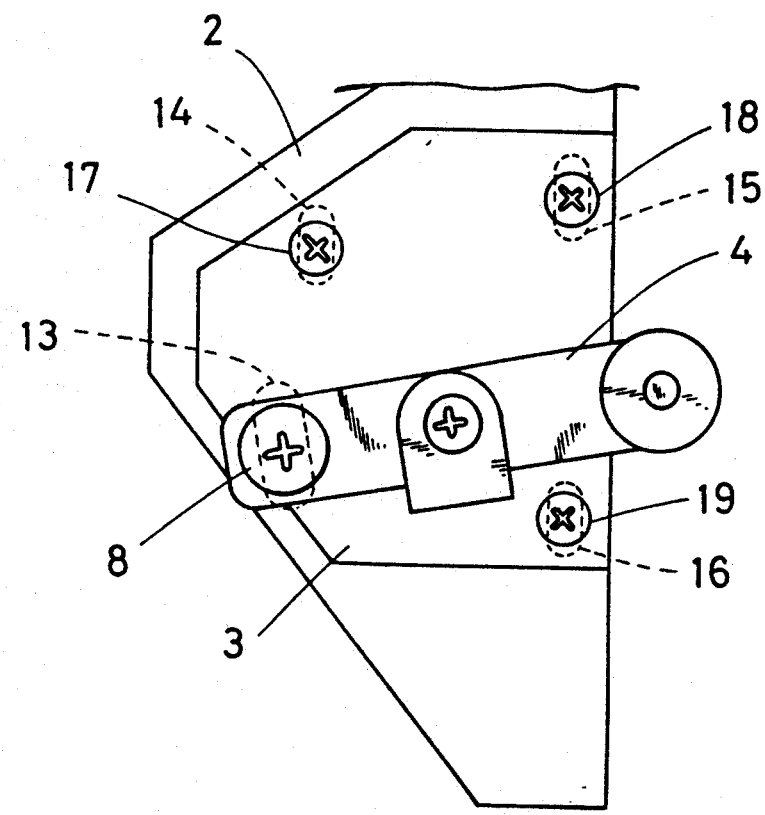
FIG. 4 is an enlarged side view showing an essential part of the exposure-scanning device.
Figure 5:
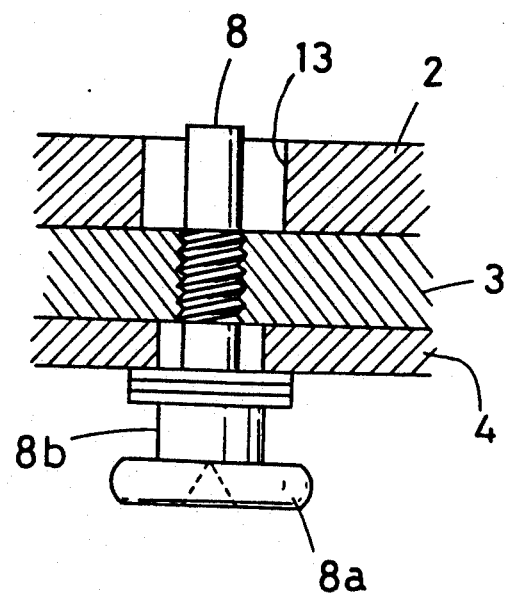
FIG. 5 is an enlarged cross-sectional view showing an essential part of the exposure-scanning device.

More specifically, the carriage 2 is provided with threaded holes 13, 14, 15 and 16 into which the screws are inserted for fixedly screwing the carriage 2 to the bracket 3 as shown in FIGS. 4 and 5. These holes 13, 14, 15 and 16, which are shaped like an elongated ellipse, have the fixed pin 8 and screws 17, 18 and 19 respectively engaged therewith to be freely movable in the vertical direction in the respective holes.

The fixed pin 8 is screwed to the bracket 3 with the external thread formed at the center thereof in the lengthwise direction. The space between the screw head 8a of the fixed pin 8 and the washer 11 equals to the length of the large diameter portion 8b of the fixed pin 8.

Provided from the support pin 7 to the fixed pin 8 is a torsional helical spring 12 which causes the lower roller 6 to be constantly in pressing contact with the guide rod 1. Specifically, one end of the torsional helical spring 12 projects to the outside from the spring bearing 9, while the other end thereof are fixed to the fixed pin 8 and secured between the screw head 8a of the fixed pin 8 and the washer 11.

The spring bearing 9 is fixed to the bracket 4, but not fixed to the bracket 3 as described above. The fixed pin 8 is integrally formed with the bracket 4, thereby having an effect of the torsional helical spring 12. Therefore, the fixed pin 8 is freely movable in the vertical direction in the hole 12.

When the fixed pin 8 is loosened to be freely movable, the fixed pin 8 and the washers 10, 10 and 11 rotate downward (in the counter-clockwise direction), while the lower roller 6 rotates upward (in the clockwise direction), around the support pin 7.

Figure 6:
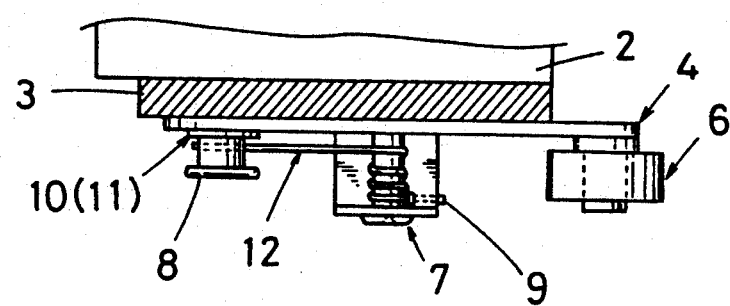
FIG. 6 is an enlarged plan view showing an essential part of the exposure-scanning device.

In this exposure-scanning device, the fixed pin 8 is attached to the bracket 4 through laminated two thrust washers 10, 10 as shown in FIG. 6. Accordingly, the rotational force generated upon screwing the fixed pin 8 to attach the torsional helical spring 12 does not affect the bracket 4 because of the laminated thrust washers 10, 10 which slide on each contact surface. The bracket 4 does not move in the screwing direction, whereby the space between the upper and lower rollers 5 and 6 set before the screwing operation can be fixedly maintained. Consequently, the mirrors or the other elements mounted on the second carriage 2 are able to perform a stable scanning operation, thereby preventing an image blur which may occur upon image formation.

Although only the structure of the ends of the second carriage 2 was explained in the above embodiment, the ends of the first carriage (another scanning member) is similarly structured.

What is claimed is:

1. An exposure-scanning device comprising:

a guide member horizontally arranged;

a scanning member slidably mounted to the guide member for performing an exposure-scanning operation;

upper and lower rollers rotatably mounted to the scanning member, both rollers vertically sandwiching the guide member;

an urging means provided at the scanning member for upwardly urging the lower roller to be constantly in contact with the guide member; and said scanning member being provided with a bracket, said lower roller being attached to one end of said bracket so as to be urged to constantly contact the guide member by the urging means.

2. An exposure-scanning device as claimed in claim 1 wherein the scanning member is provided with a bracket having the lower roller attached to its one end so as to be urged to be constantly contact with the guide member by the urging means.

3. An exposure-scanning device as claimed in claim 1 wherein the urging means comprises a support member pivotably supporting the bracket to the scanning member to allow its up and down movement with respect to the scanning member and a spring member attached to the bracket for urging the lower roller to be constantly in contact with the guide member.

4. An exposure-scanning device as claimed in claim 1 wherein the urging means comprises a support member pivotably supporting the bracket, at its center, to the scanning member to allow its up and down movement with respect to the scanning member, a screw member screwed to the scanning member through the other end of the bracket, said screw member being freely movable in the vertical direction within the position where the screw member is attached when loosened, and a spring member provided from the screw member to the support member for urging the lower roller to be constantly in contact with the guide member.

5. An exposure-scanning device as claimed in claim 4 wherein the screw member is screwed through a sliding washer means which slides on the surface where the other end of the bracket to which the lower roller is attached is in contact with the washer, a predetermined space being present between the screw head of the screw member and the washer means, and the spring member is bridged from the support member to the space of the screw member.

6. An exposure-scanning device as claimed in claim 5 wherein the washer means comprises a plurality of washers, each of which is laminated with one another.

7. An exposure-scanning device as claimed in claim 6 wherein each of the washers is made of plastic.

8. An exposure-scanning device as claimed in claim 1 wherein said guide member comprises a pair of guide rods.

9. An exposure-scanning device comprising:
- a guide member horizontally arranged, said guide member comprising a pair of guide rods;
- a scanning member slidably mounted to the guide member for performing an exposure-scanning operation;
- upper and lower rollers rotatably mounted to the scanning member, both rollers vertically sandwiching the guide member;
- an urging means provided at the scanning member for upwardly urging the lower roller to be constantly in contact with the guide member.

* * * * *